United States Patent
Stephens et al.

(10) Patent No.: US 11,562,060 B2
(45) Date of Patent: Jan. 24, 2023

(54) SECURE PRIVATE PORTABLE VAULT CONTAINER

(71) Applicant: Conveyance Media Group LLC, Lauderdale-By-TheSea, FL (US)

(72) Inventors: Sean Stephens, Wylie, TX (US); George E. Manges, Wylie, TX (US); William Browning, Fort Lauderdale, FL (US)

(73) Assignee: Conveyance Media Group LLC, Wylie, TX (US)

( * ) Notice: Subject to any disclaimer, the term of this patent is extended or adjusted under 35 U.S.C. 154(b) by 2 days.

(21) Appl. No.: 17/480,866

(22) Filed: Sep. 21, 2021

(65) Prior Publication Data

US 2022/0107999 A1     Apr. 7, 2022

Related U.S. Application Data

(60) Provisional application No. 63/086,193, filed on Oct. 1, 2020.

(51) Int. Cl.
*G06F 21/00*     (2013.01)
*G06F 21/40*     (2013.01)
(Continued)

(52) U.S. Cl.
CPC .......... *G06F 21/40* (2013.01); *G06Q 30/0255* (2013.01); *H04L 9/088* (2013.01)

(58) Field of Classification Search
CPC .......... G06F 21/40; G06F 21/44; G06F 21/53; G06Q 30/0255; H04L 9/088; H04L 9/3213
See application file for complete search history.

(56) References Cited

U.S. PATENT DOCUMENTS

| 7,587,366 B2 | 9/2009 | Grim, III et al. |
| 8,117,648 B2 * | 2/2012 | Slaton ................... H04L 63/083 |
| | | 709/248 |

(Continued)

FOREIGN PATENT DOCUMENTS

WO     2000075835 A3     12/2000

OTHER PUBLICATIONS

O'Gorman, "Comparing passwords, tokens, and biometrics for user authentication", Proceedings of the IEEE, vol. 91, No. 12, Dec. 2003.*

*Primary Examiner* — Morshed Mehedi
(74) *Attorney, Agent, or Firm* — Christopher & Weisberg, P.A.

(57) ABSTRACT

A method, system and apparatus are disclosed. A device includes processing circuitry that includes a processor and a memory, where the memory is configured to store a logical container including a plurality of encrypted data portions and a plurality of executable code portions. Each encrypted data portion and executable code portion is separately encrypted with a different encryption key and associated with a user. The processing circuitry receives, from a software application operating in another device, a first request associated with at least one encrypted data portion and one executable code portion of the logical container. The first request includes an encryption token associated with the software application. In response to the first request, the processing circuitry triggers a verification code portion to determine whether the first request is authorized and performs at least one operation to fulfill the first request in response to determining the request is authorized.

20 Claims, 13 Drawing Sheets

(51) Int. Cl.
*H04L 9/08* (2006.01)
*G06Q 30/02* (2012.01)

(56) References Cited

U.S. PATENT DOCUMENTS

| | | |
|---|---|---|
| 8,788,819 B2 | 7/2014 | Broder et al. |
| 9,092,494 B1 * | 7/2015 | Grim, III ............ H04L 63/0442 |
| 9,705,865 B2 | 7/2017 | Slaton et al. |
| 9,734,249 B2 | 8/2017 | Boccon-Gibod |
| 10,108,811 B1 * | 10/2018 | Walker .................... G06F 21/31 |
| 10,162,982 B2 * | 12/2018 | de Oliveira ......... G06F 21/6245 |
| 2007/0033397 A1 * | 2/2007 | Phillips, II ............ H04L 9/3213 |
| | | 713/168 |
| 2010/0262837 A1 | 10/2010 | Kulin |
| 2012/0203733 A1 | 8/2012 | Zhang |
| 2015/0074419 A1 * | 3/2015 | Durham .................. G06F 21/53 |
| | | 713/187 |
| 2020/0089908 A1 | 3/2020 | Faltas |
| 2020/0314167 A1 * | 10/2020 | Achyuth ............. G06F 21/6209 |

* cited by examiner

SECURE PRIVATE PORTABLE VAULT CONTAINER

CROSS REFERENCE TO RELATED APPLICATION

The present application claims priority to and the benefit of the filing date of U.S. Provisional Patent Application Ser. No. 63/086,193, filed Oct. 1, 2020, which is incorporated herein by reference in its entirety.

FIELD

The present disclosure relates data security, and in particular to a logical vault or container such as a user-managed logical container.

BACKGROUND

In today's electronic driven society, users may generate vast amounts of electronic user-specific data. A user may have various accounts such bank account(s), email account(s), shopping account(s), over-the-top (OTT)/video platform account(s), among other personal account(s), etc. which may be accessible and/or usable over the internet. For example, an online shopping account with a retailer may be associated with login/password data, payment (e.g., credit card, bank account, etc.) data, shopping history, email address, personal data (e.g., address information, etc.), content viewing history, advertisement viewing history, geographic information, browsing history, etc., which may all be stored by the retailer and/or accessible by retailer according to the terms of service between the retailer and user. That is, a software application associated with the retailer may be configured to collect vast amounts of data from the user while using the software application or even when the application is not in use, and transmit this data for storage at a remote site for use by both the user and retailer according to terms of service that are subject to change by the retailer.

This common situation is not without issues. First, users tend to have little to no control over how the vast amounts of user data are used. The retailer or entity that operates the software application may have access to this vast amount of information where the retailer can use highly personal data for numerous purposes such as advertisements, data analytics, etc., without having to inform the user when the data is being used. Also, the retailer may even be able to sell this highly personal data to other companies, such as data analytic companies that parse through and analyze the data in order to monetize the results. Further, even if the user deletes the software application and user data from the user's mobile phone, there is no way to confirm whether the user's data was also deleted from the remote database where the data is stored. Therefore, the lack of user control over the user's data is one issue facing users today.

Second, having a retailer or third party store vast amounts of user data that is available to the system is vulnerable to hacking or security breaches that may result in some or all of the user data being exposed. The user has little to no influence as to: how the user data is stored by the retailer and the extend of security procedures for securing the data. Third, existing solutions are not readily scalable as software application creators have to build the user and storage backends. Fourth, the retailer that has access to the user data is able to generate revenue from advertising using the user data but may be liable for misuse of user data.

Therefore, existing systems suffer from various issues with respect to management of data associated with a user.

SUMMARY

Some embodiments advantageously provide methods, systems and devices for a user-managed logical container. According to one or more embodiments, systems and methods that allow for individual users to create, own and control a stand-alone secure, encrypted, private, personal, portable, geographically independent electronic vault container (i.e., logical vault/container) are provided. The vault can be located in the cloud or on a removable device determined by the owner and is used to store, control, share or prevent sharing of any personal or personally owned data such as a user profile, application data, secure email, secure real-time messaging, secure real-time notifications, browsing history, content viewing history, advertising profiles, purchasing profiles, financial data (e.g., credit card information, etc.), universal sharable shopping cart, user preferences, authorized advertisers, advertising profiles, geolocation information, parental controls, etc. with services such as social media platforms, online sales platforms, search engines, email providers, messaging systems, etc. The vault may optionally include a built-in capability for communicating via a virtual private network (VPN) which allows the owner/user to communicate securely and anonymously with the vault via the VPN.

According to one or more embodiments, a method is provided that allows for users to create and control access to a secure, private, personal, portable electronic virtual container, vault (i.e., logical vault/container). The vault can be used to securely store and provide controlled secure access to data/information such as one or more of personal data, application data, advertising transactions and financial transaction. The vault may also provide for secure web browsing via a built-in virtual private network (VPN). The vault provides granular secure access to data, advertisements and financial transactions via internal code stored in the vault that acts as a real-time owner configurable data control system (i.e., virtual/logical controller stored in the vault as executable code). All data and transaction queries are authorized in real-time by the controller. The vault allows the owner/user to configure controller access and functionality systems via an interface such as an application program interface (API) that is located internally, i.e., located/stored in the vault as executable code. Controller authorized third party applications can store and retrieve information by querying the controller. Controller authorized third party applications can request advertising and financial transactions by querying the controller.

One or more embodiments may provide one or more of the following advantages:

Users own, store and control their data via the vault such that no data is stored by a company. Users can update authorized queries by a company for information in real time;

Allows software application creators/developers to create applications without having to build the user and storage backends as they can link to the individual users' vault using, for example, sdk, to store and retrieve all application information in a secure, dedicated application area in the vault.

Each user may have their own separate vault which is not exposed to hackers, thereby reducing liability;

The vault provides and may automatically monetize the advertisements to the application based on the parameters set by the owner/user. The owner/user may receive a portion of the advertisement revenue. This allows application developers to take advantage of advertising while reducing the risk of liability associated with using the user data; and Companies may logically store products in the vault's universal shopping cart such as a wish list, which can be securely stored and shared with other platforms or vault owners. Products can be purchased through the vault's financial interface.

Further, various types of applications can advantageously use the vault described herein.

According to one aspect, a device is provided. The device includes processing circuitry that includes a processor, and a memory where the memory is configured to store a logical container. The logical container includes a plurality of encrypted data portions and a plurality of executable code portions where each of the plurality of encrypted data portions and the plurality of executable code portions are separately encrypted with a different encryption key and are associated with a user is provided. The processing circuitry is configured to receive, from a software application operating in another device, a first request associated with at least one of the plurality of encrypted data portions and with at least one of the plurality of executable code portions of the logical container, where the first request includes an encryption token associated with the software application. In response to the first request, the processing circuitry triggers a verification code portion of the plurality of executable code portions to determine whether the first request is authorized, and performs at least one operation to fulfill the first request in response to determining the request is authorized.

According to this aspect, in some embodiments, the at least one operation includes running a first executable code portion of the plurality of executable code portions where the first executable code portion includes code for accessing a first encrypted data portion of the plurality of encrypted data portions. In some embodiments, the processing circuitry is further configured to receive, from the software application, a linking request to link the software application to the logical container. The processing circuitry determines whether to authorize the linking based at least in part on a user verification. In response to determining the linking is authorized, the processing circuitry assigns and transmits a unique encryption key to the software application, and creates a storage space in the memory that is specific to the software application, where the storage space is encrypted with the assigned unique encryption key. In some embodiments, the logical container is configured to be transferable to another device in response to a transfer request from the user, where the transfer request triggers the execution of a second executable code portion of the plurality of executable code portions and where the second executable code portion includes at least one operation to determine whether the transfer request is authorized. In some embodiments, the logical container is configured to request a targeted advertisement for the user based on at least one of the plurality of encrypted data portions. In some embodiments, the plurality of encrypted data portions includes at least one of the user's advertising history and the user's purchase history. In some embodiments, the plurality of executable code portions includes an advertising request application program interface, API, code portion. In some embodiments, the apparatus is a cloud computing node of a third party entity. In some embodiments, the apparatus is accessible by a primary device associated with the user to access the logical container using a two-factor authentication. In some embodiments, the verification code portion is configured to cause the processing circuitry to compare the first request with a permission data portion of the plurality of encrypted data portions that is defined by the user, determine whether the first request meets at least one criterion in the permission data portion, and perform a user-based authentication to determine whether to authorize the software application According to another aspect, a method for securing a user's data is provided. The method is implemented by a device including processing circuitry, where the processing circuitry includes a processor and a memory, and where the memory is configured to store a logical container. The logical container includes a plurality of encrypted data portions and a plurality of executable code portions. Each of the plurality of encrypted data portions and the plurality of executable code portions is separately encrypted with a different encryption key and is associated with a user. The method includes receiving, from a software application operating in another device, a first request associated with at least one of the plurality of encrypted data portions and with at least one of the plurality of executable code portions of the logical container. The first request includes an encryption token associated with the software application. In response to the first request, the method triggers a verification code portion of the plurality of executable code portions to determine whether the first request is authorized. The method then performs at least one operation to fulfill the first request in response to determining the request is authorized.

According to this aspect, in some embodiments, the method further includes running a first executable code portion of the plurality of executable code portions, where the first executable code portion includes code for accessing a first encrypted data portion of the plurality of encrypted data portions. In some embodiments, the method further includes receiving, from the software application, a linking request to link the software application to the logical container, determining whether to authorize the linking based at least in part on a user verification, assigning and transmitting a unique encryption key to the software application in response to determining the linking is authorized, and creating a storage space in the memory that is specific to the software application, where the storage space is encrypted with the assigned unique encryption key. In some embodiments, the method further includes transferring the logical container to another device in response to a transfer request from the user, where the transfer request triggers the execution of a second executable code portion of the plurality of executable code portions, and where the second executable code portion includes at least one operation to determine whether the transfer request is authorized. In some embodiments, the plurality of encrypted data portions includes at least one of the user's advertising history and the user's purchase history. In some embodiments, the plurality of executable code portions includes an advertising request application program interface, API, code portion. In some embodiments, the device is a cloud computing node of a third party entity. In some embodiments, the method further includes comparing the first request with a permission data portion of the plurality of data portions that is defined by the user, determining whether the first request meets at least one criterion in the permission data portion, and performing a user-based authentication to determine whether to authorize the software application.

According to yet another aspect, a cloud computing node including processing circuitry is provided. The processing circuitry includes a processor and a memory, where the memory is configured to store a logical container, and where the logical container includes a plurality of encrypted data portions and a plurality of executable code portions. Each of the plurality of encrypted data portions and the plurality of executable code portions is separately encrypted with a different encryption key and being associated with a user. The plurality of encrypted data portions includes at least one of the user's advertising history and the user's purchase history. The plurality of executable code portions includes an advertising request application program interface, API, code portion. The processing circuitry is configured to receive, from a software application operating in another device, a first request associated with at least one of the plurality of encrypted data portions and with at least one of the plurality of executable code portions of the logical container. The first request includes an encryption token associated with the software application. In response to the first request, the processing circuitry triggers a verification code portion of the plurality of executable code portions to determine whether the first request is authorized, and performs at least one operation to fulfill the first request in response to determining the first request is authorized. The at least one operation includes running a first executable code portion of the plurality of executable code portions, where the first executable code portion includes code for accessing a first encrypted data portion of the plurality of encrypted data portions, receiving, from the software application, a linking request to link the software application to the logical container, and determining whether to authorize the linking based at least in part on a user verification. In response to determining the linking is authorized, the processing circuitry assigns and transmits a unique encryption key to the software application, and creates a storage space in the memory that is specific to the software application. The storage space is encrypted with the assigned unique encryption key. The logical container is configured to transfer to another device in response to a transfer request from the user, where the transfer request triggers the execution of a second executable code portion of the plurality of executable code portions. The second executable code portion includes at least one operation to determine whether the transfer request is authorized. The verification code portion is configured to compare the first request with a permission data portion of the plurality of data portions that is defined by the user, determine whether the first request meets at least one criterion in the permission data portion, and perform a user-based authentication to determine whether to authorize the software application.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
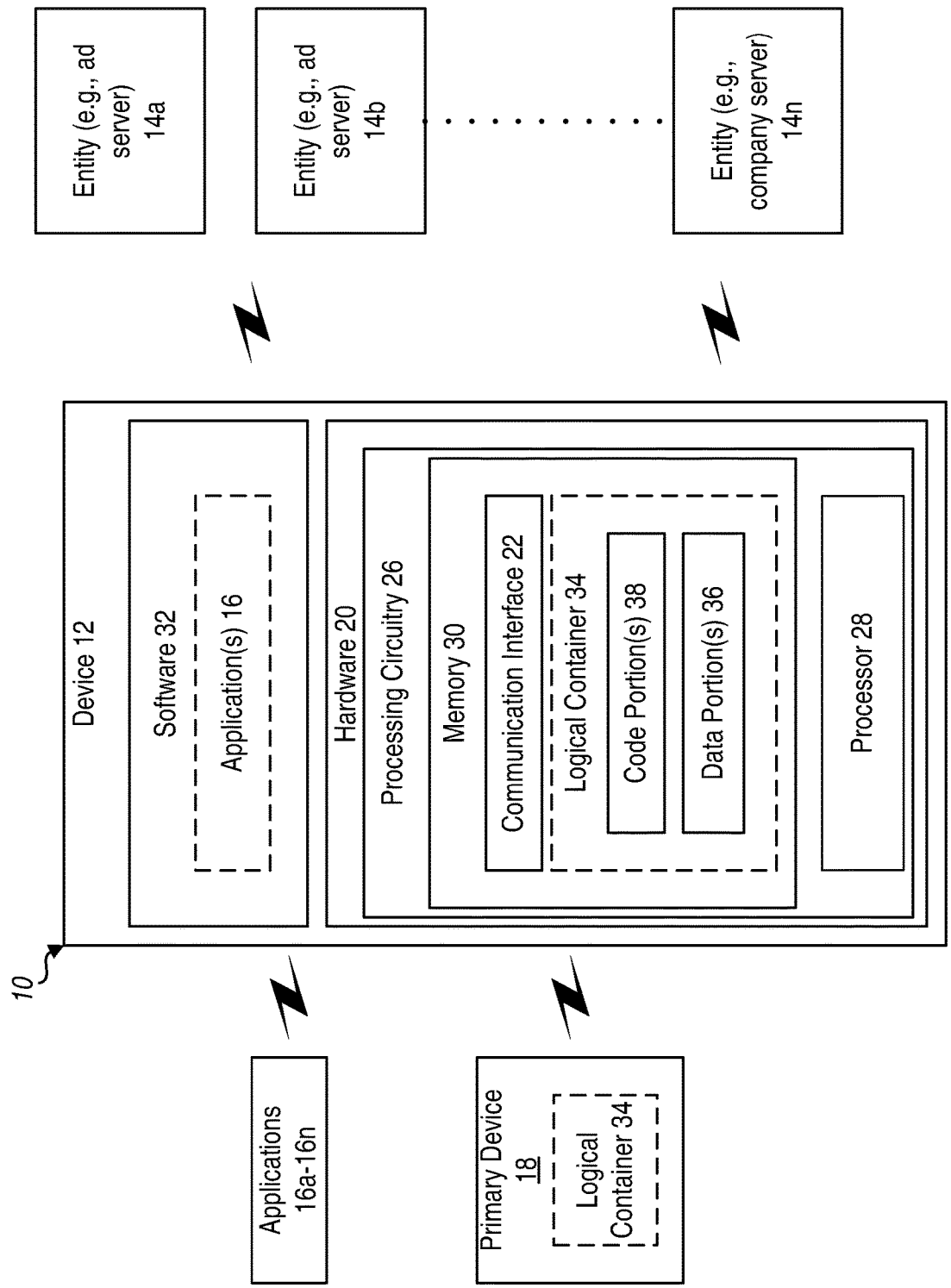
FIG. 1 is a block diagram of a system according to the principles of the disclosure.

Before describing in detail exemplary embodiments, it is noted that the embodiments reside primarily in combinations of apparatus components and processing steps related to user-managed logical container (also referred to as a "vault"). As used herein, the term "container" refers to logical elements such as data structures used to organize and store objects, such as data elements. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

In some embodiments, the device can be any type of wired and/or wireless device capable of communicating with one or more entities and/or devices. In one or more embodiments, the device may be a wireless device, mobile device, laptop, tablet, computer, mobile terminal, smart phone, USB dongles, Internet of Things (IoT) device, wearable, TV, etc.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide a user-managed logical container. Referring now to the drawing figures, in which like elements are referred to by like reference numerals, there is shown in FIG. 1 a schematic diagram of a system 10, according to one or more embodiments, which comprises device 12 that is in communication with one or more entities 14*a*-14*n*, one or more applications 16 (e.g., software application executed in a separate device/apparatus), a primary device 18, etc., as described herein. In one or more embodiments, device 12 may be a container/vault device or server that may be operated by a third party and is responsible for at least the creation and/or initialization of a logical container. Device 12 includes hardware 20 enabling it to perform one or more device 12 functions described herein. Hardware 20 includes communication interface 22 for communicating with an interface of different entities 14, for example, via wired and/or wireless communication. That is, communication interface 22 facilitates a connection to one or more entities 14 and/or other devices 12 in system 10.

In one or more embodiments, the hardware 20 of device 12 may include processing circuitry 26. Processing circuitry 26 may include processor 28 and memory 30. In particular, in addition to or instead of a processor, such as a central processing unit, and memory, the processing circuitry 26 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 28 may be configured to access (e.g., write to and/or read from) the memory 30, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, device 12 further has software 32 stored internally in, for example, memory 30, or stored in external memory (e.g., database, storage array, network storage device, etc.) accessible by device 12 via an external connection. The software 32 may be executable by the processing circuitry 26. The processing circuitry 26 may be configured to control any of the methods and/or processes described herein and/or to cause such methods, and/or processes to be performed, e.g., by device 12. Processor 28 corresponds to one or more processors 28 for device 12 functions described herein. The memory 30 is configured to store data, programmatic software code and/or other information such as in logical container 34 configuration described herein.

In some embodiments, memory 30 includes a logical container that includes one or more data portions 36*a*-36*n* (collectively referred to as data portion 36) where each data portion 36 is encrypted differently from other data portions 36. For example, each data portion 36 may be encrypted using a respective encryption key and may have a respective storage location in memory 30. In one or more embodiments, one or more data portions 36 are stored in memory 30 using a password/biometric key and may only be written or accessed when authorized by the user (i.e., owner of data and/or logical container 34) and decrypted using the key. Further, one or more data portions 36 may be configured such as by the user (i.e., data and/or logical container 34 owner) to have one or more of a fixed amount of storage, rolling storage and unlimited storage in, for example, memory 30. Some examples of data stored in data portions 36 include one or more of owner data with file storage, advertising and purchase history, access and request history including request location, application data for code portion 38*a*, application data for code portion 38*b*, etc., among other data associated with the user and/or an application.

In some embodiments, logical container 34 includes one or more code portions 38*a*-38*n* (collectively referred to as code portion 38) where each code portion 38 is encrypted using a respective encryption key and may have a respective storage location in memory 30. In particular, code portion 38 may correspond to executable code (i.e., executable software instruction). Some examples of code portions 38 include one or more interface application program interface (API), security and two factor authentication (2FA) code, advertising request API code, owner web administrator, permission, profile, advertisement interface code, real-time encrypted messaging, notification, email, optional VPN code, optional video conference server code, optional voice assistant code, etc., among other code. Software 32 and/or one or more code portions 38, when executed by the processor 28 and/or processing circuitry 26, causes the processor 28 and/or processing circuitry 26 to perform one or more processes, as described herein.

The communication system 10 further includes the entity 14 already referred to. Entity 14 may generally correspond to a server that is in communication with device 12 where the server may request and/or provide data to device 12. For example, entity 14 may request data in one or more data portions 36 from device 12 and/or provide data associated with one or more code portions 38 and/or one or more requests from logical container 34. Further, one or more applications 16 may be in communication with device 12 where application 16 is able to request and/or provide data from/to device 12, as described herein. Also, primary device 18 may generally refer to a device similar to device 12 that the user may designate as the user's primary device that may be used to request and configure the logical container, for 2FA, modify one or more options/settings for the logical container, etc., as described herein.

Further, while logical container 34 is described as residing in memory 30 of device 12, logical container 34 may advantageously be transferred, with permission for the user/owner, to another device 12, primary device 18, entity 14, cloud network, USB drive, etc., thereby providing the user with control of where the logical container 34 is stored.

Figure 2:
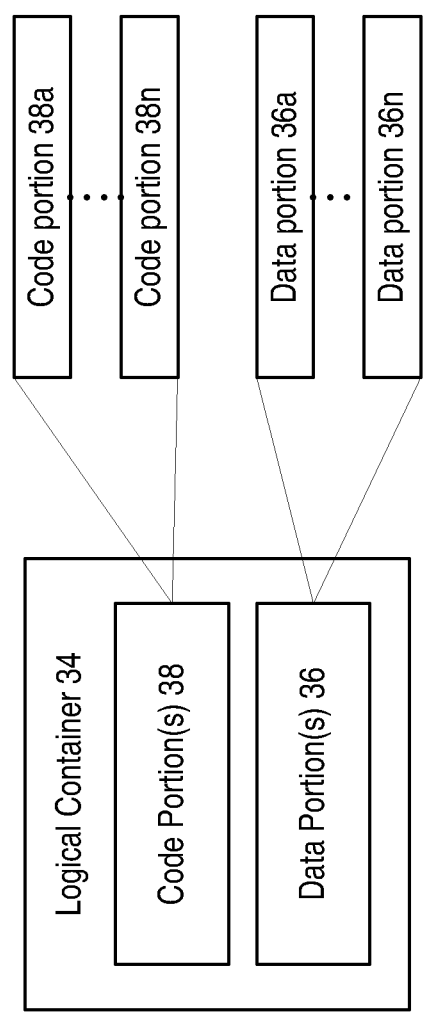
FIG. 2 is a block diagram of a logical container 34 according to the principles of the disclosure.

FIG. 2 is a block diagram of an example logical container 34 according to the principles of the disclosure. In one or more embodiments, code portion 38 includes separately encrypted and stored code portions 38*a*-38*n* where each code portion 38 may be associated with a different encryption key from the other code portions 38. Further, data portion 36 may include separately encrypted and stored data portions 36*a*-36*n* where each data portion 36 may be associated with a different encryption key from other data portions 36.

Figure 3:
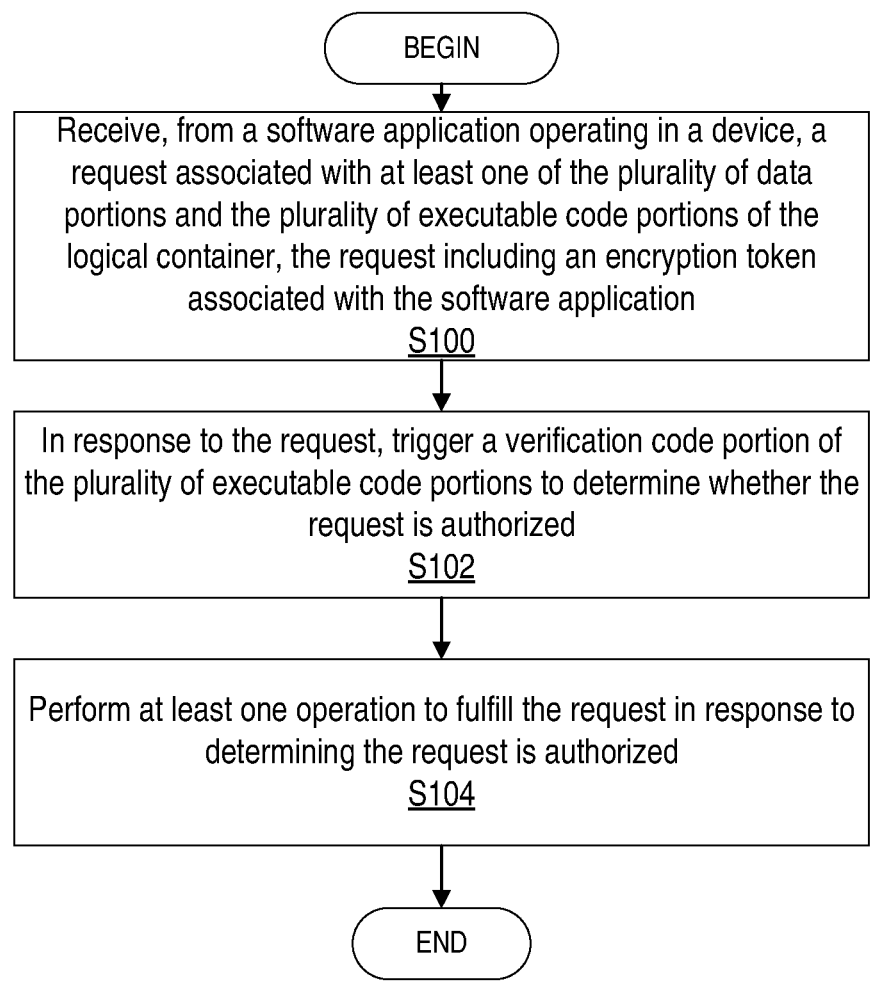
FIG. 3 is a flowchart of an example process in a device according to the principles of the disclosure.

FIG. 3 is a flowchart of an example process in a device 12 according to the principles of the disclosure. One or more blocks described herein may be performed by one or more elements of device 12 such as by one or more of processing circuitry 26 (including the logical container 34), processor 28, and/or communication interface 22. Device 12 is configured to receive (Block S100), from a software application 16 operating in another device, a request associated with at least one of the plurality of data portions 36 and the plurality of executable code portions 38 of the logical container 34 where the request includes an encryption token associated with the software application 16. Device 12 is configured to, in response to the request, trigger (Block S102) a verification code portion 38 of the plurality of executable code portions 38 to determine whether the request is authorized, as described herein. Device 12 is configured to perform (Block S104) at least one operation to fulfill the request in response to determining the request is authorized, as described herein.

Figure 4:
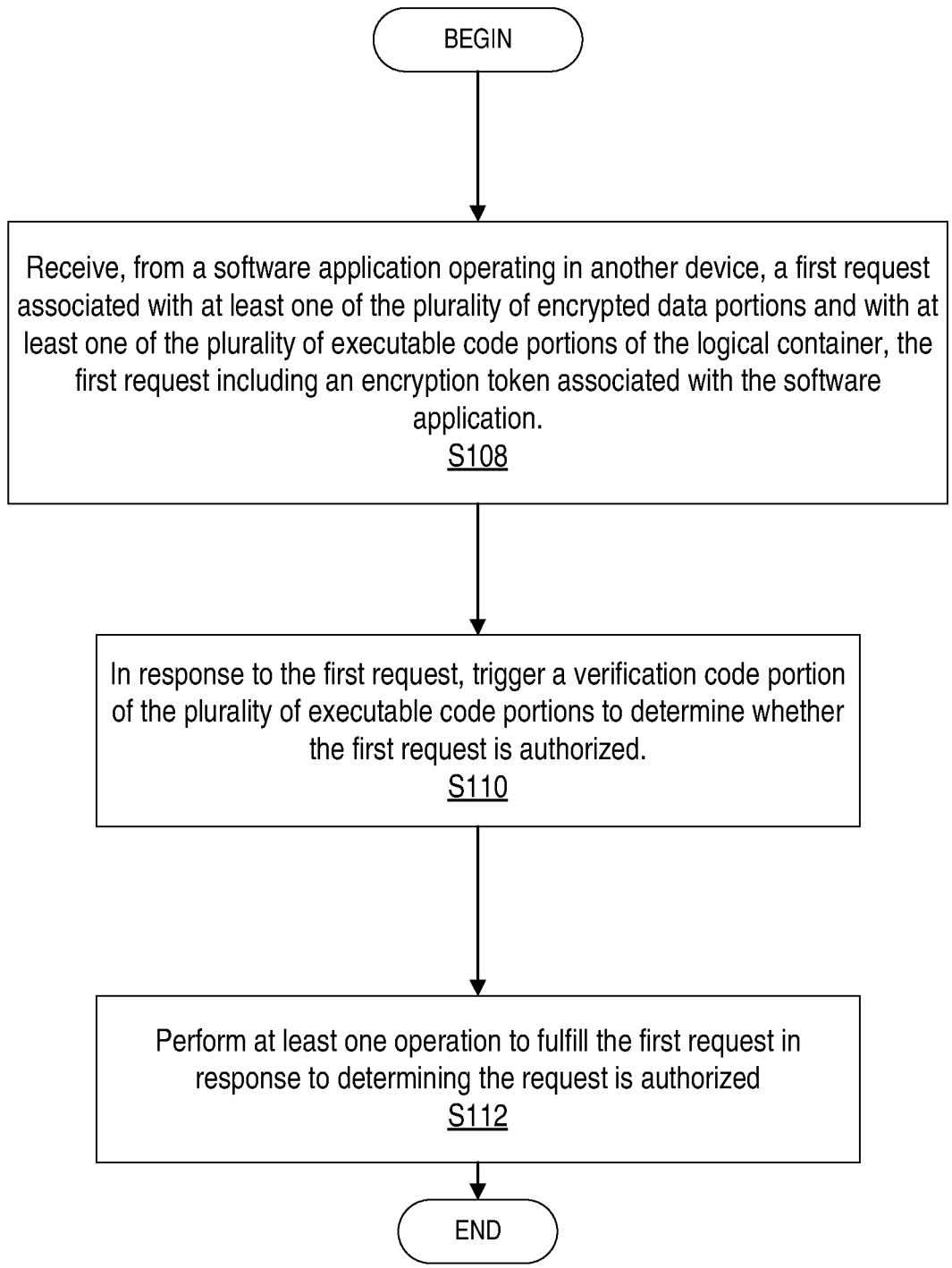
FIG. 4 is a flowchart of another example process according to the principles of the disclosure.

FIG. 4 is a flowchart of another example process according to the principles of the disclosure. One or more blocks and/or device 12 functions described below may be performed by one or more elements of device 12 such as by one or more of processing circuitry 26 (including the logical container 34), processor 28, and/or communication interface 22. Device 12 is configured to receive (Block S108), from a software application 16 (e.g., software application executed in a separate device/apparatus), a first request associated with at least one of the plurality of data portions 36 and the plurality of executable code portions 38 of the logical container 34 where the first request includes an encryption token associated with the software application 16. Device 12 is configured to, in response to the request, trigger (Block S110) a verification code portion 38 of the plurality of executable code portions 38 to determine whether the first request is authorized, as described herein. Device 12 is configured to perform (Block S112) at least one operation to fulfill the first request in response to determining the first request is authorized, as described herein.

In some embodiments, the at least one operation includes running a first executable code portion of the plurality of executable code portions 38, where the first executable code portion includes code for accessing a first encrypted data portion of the plurality of encrypted data portions 36. In some embodiments, device 12 is configured to receive, from the software application 16, a linking request to link the software application 16 to the logical container 34 and determines whether to authorize the linking based at least in part on a user verification. In response to determining the linking is authorized, device 12 assigns and transmits a unique encryption key to the software application 16 and creates a storage space in the memory 30 that is specific to the software application 16. The storage space is encrypted with the assigned unique encryption key. In some embodiments, the logical container 34 is configured to be transferrable to another device in response to a transfer request from the user. The transfer request triggers the execution of a second executable code portion of the plurality of executable code portions 38, where the second executable code portion includes at least one operation to determine whether the transfer request is authorized.

In some embodiments, the logical container 34 is configured to request a targeted advertisement for the user based on at least one of the plurality of encrypted data portions 36. In some embodiments, the plurality of encrypted data portions 36 includes at least one of the user's advertising history and the user's purchasing history. In some embodiments, the plurality of executable code portions 38 includes an advertising request application program interface, API, code portion. In some embodiments, the device 12 is a cloud computing node of a third party entity. In some embodiments, the device 12 is accessible by a primary device 18 associated with the user to access the logical container 34 using a two-factor authentication. In some embodiments, the verification code portion is configured to cause the processing circuitry 26 to compare the first request with a permission data portion of the plurality of data portions 36 that is defined by the user, determine whether the first request meets at least one criterion in the permission data portion, and perform a user-based authentication to determine whether to authorize the software application 16.

Figure 5:
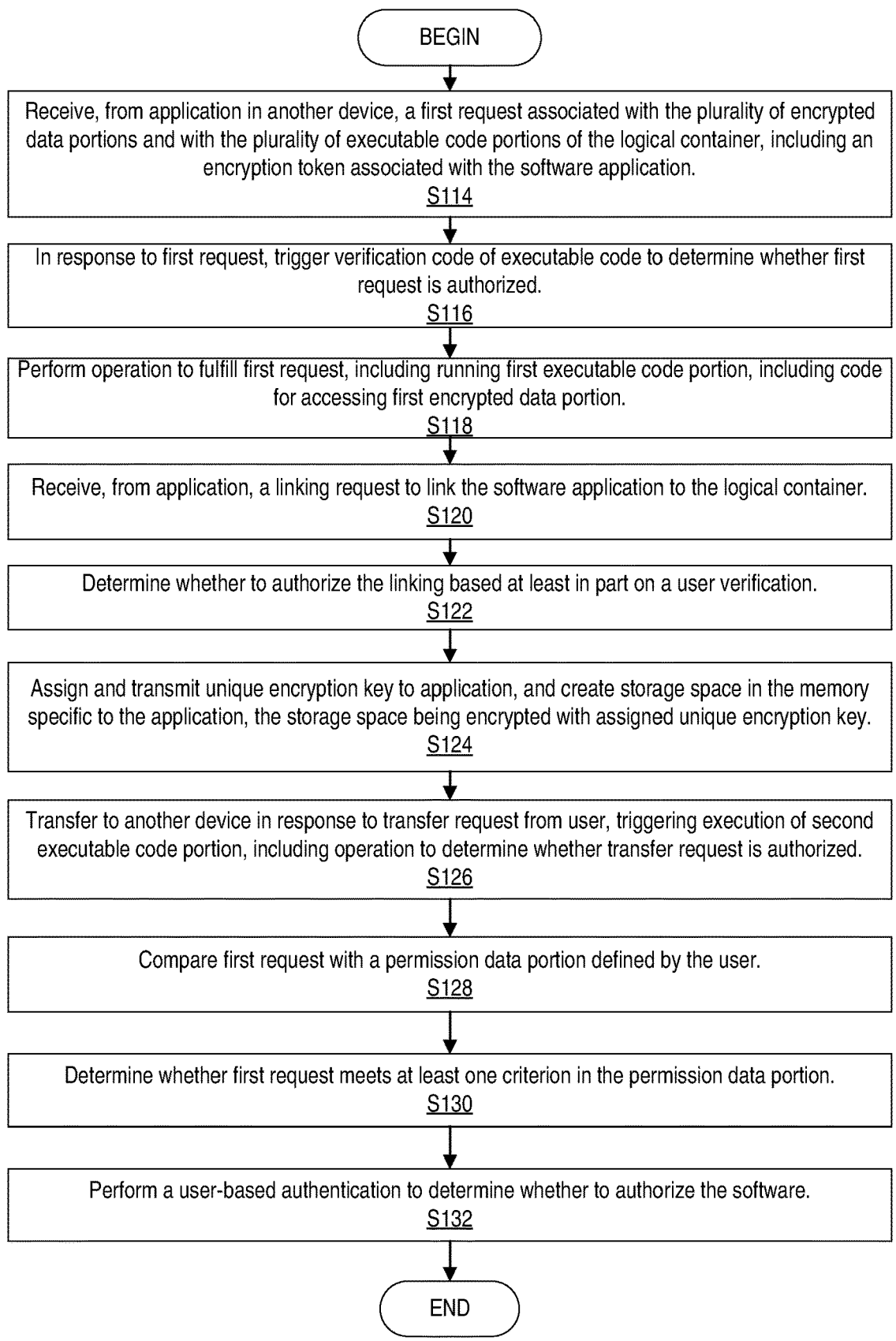
FIG. 5 is a flowchart of another example process according to the principles of the disclosure.

FIG. 5 is a flowchart of another example process according to the principles of the disclosure. One or more blocks described herein may be performed by one or more elements of device 12 such as by one or more of processing circuitry 26 (including the logical container 34), processor 28, and/or communication interface 22. Device 12 is configured to receive (Block S114), from a software application 16 (e.g., software application executed in a separate device/apparatus), a first request associated with at least one of the plurality of data portions 36 and the plurality of executable code portions 38 of the logical container 34, where the first request includes an encryption token associated with the software application 16. Device 12 is configured to, in response to the request, trigger (Block S116) a verification code portion 38 of the plurality of executable code portions 38 to determine whether the first request is authorized, as described herein. Device 12 is configured to perform (Block S118) at least one operation to fulfill the first request in response to determining the first request is authorized, as described herein. The at least one operation includes running a first executable code portion of the plurality of executable code portions 38, where the first executable code portion includes code for accessing a first encrypted data portion of the plurality of encrypted data portions 36.

Device 12 is configured to receive (Block S120), from the software application 16, a linking request to link the software application 16 to the logical container 34 and to determine (Block S122) whether to authorize the linking based at least in part on a user verification. In response to determining the linking is authorized, the device 12 assigns and transmits (Block S124) a unique encryption key to the software application 16 and creates a storage space in the memory 30 that is specific to the software application 16. The storage space is encrypted with the assigned unique encryption key. The logical container 34 is configured to be transferrable to another device in response to a transfer request from the user, where the transfer request (Block S126) triggers the execution of a second executable code portion of the plurality of executable code portions 38, and where the second executable code portion includes at least one operation to determine whether the transfer request is authorized. The verification code portion is configured to cause the processing circuitry 26 to compare (Block S128) the first request with a permission data portion of the plurality of data portions 36 that is defined by the user, determine (Block S130) whether the first request meets at least one criterion in the permission data portion, and perform (Block S132) a user-based authentication to determine whether to authorize the software application 16.

Figure 6:
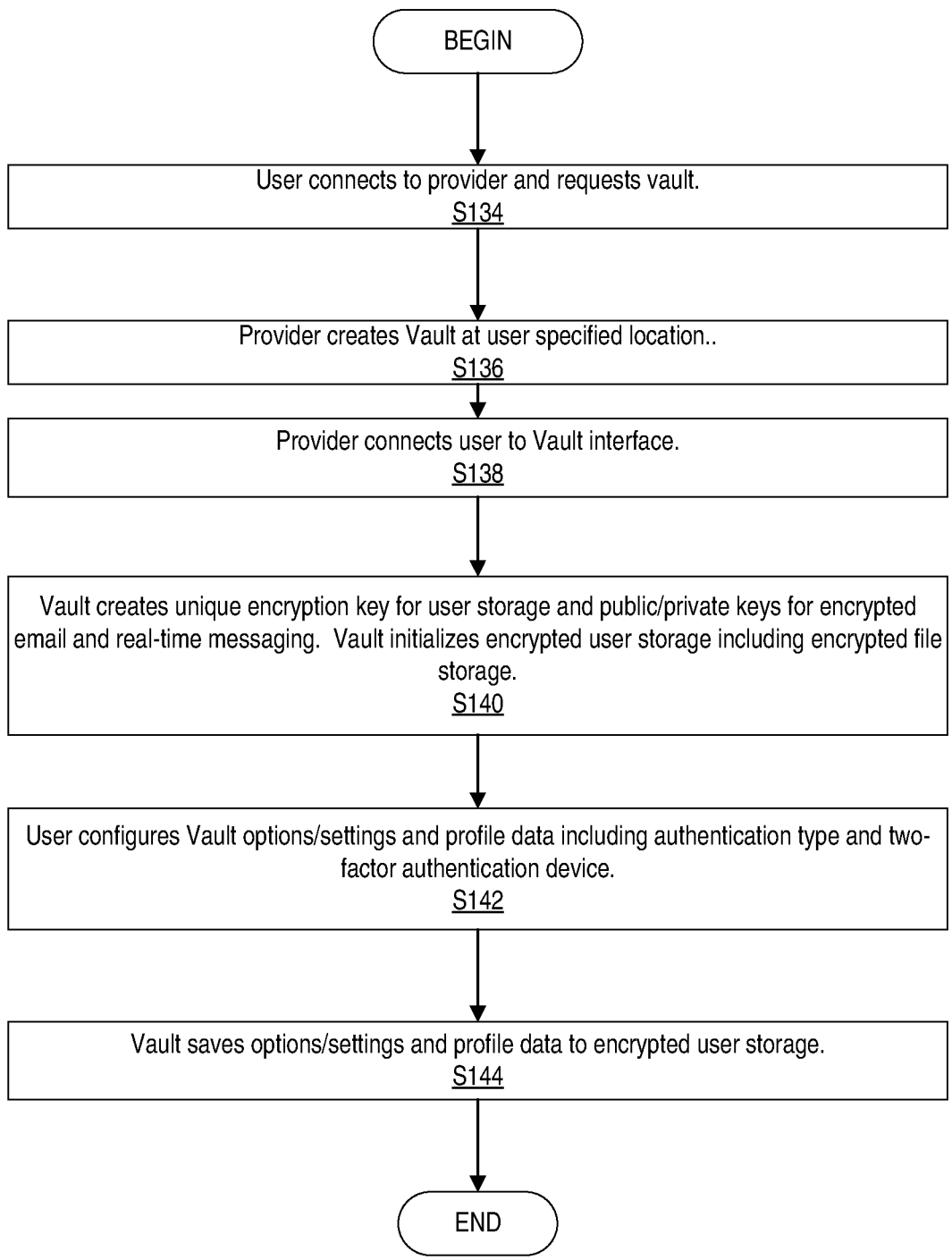
FIG. 6 is a flowchart of another example process according to the principles of the disclosure.

FIG. 6 is a flowchart of another example process according to the principles of the disclosure. In particular, FIG. 6 relates to creation or association of a logical container with a specific user (i.e., owner). Device 12 may be a container/vault device and/or server or cloud computing node of a third party entity that contains a logical container 34 having user-modifiable settings and/or profiles. For example, a user connects to provider and requests a vault (Block S134). That is, the user may dynamically request the creation of a vault.

The provider creates (Block S136) the vault at a user specification location such as in device 12. The provider connects (Block S138) the user to the vault interface. The vault creates (Block S140) a unique encryption key for user storage and public and/or private keys for encrypted email and real-time messaging. The vault also initializes (Block S140) encrypted user storage including encrypted file storage. The user configures (Block S142) the vault with options and/or settings and profile data including authentication type and configures a two-factor authentication device. The vault saves (Block S144) the options and/or settings and the profile data to encrypted user storage.

Figure 7:
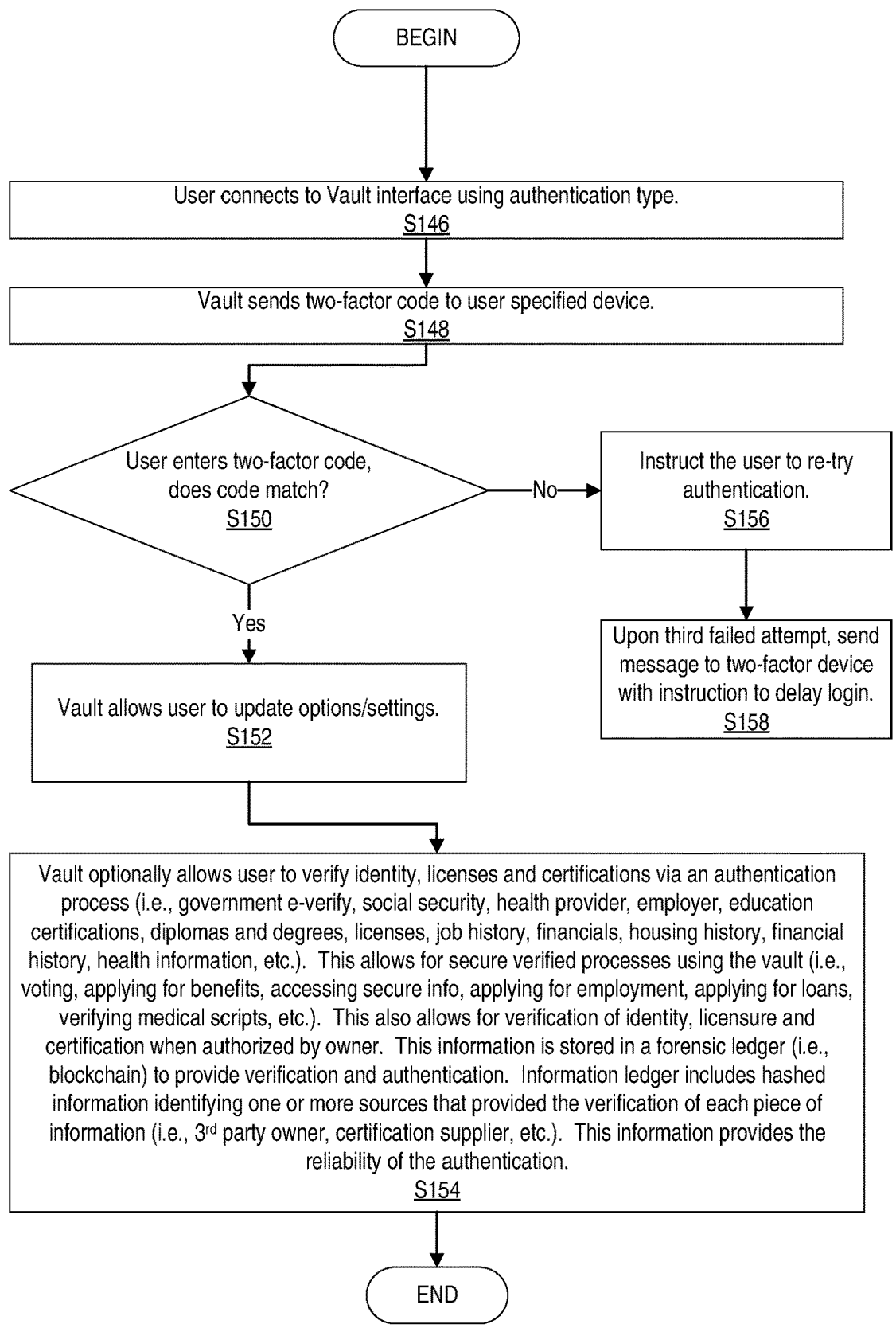
FIG. 7 is a flowchart of another example process according to the principles of the disclosure.

FIG. 7 is a flowchart of another example process according to the principles of the disclosure. In particular, FIG. 7 relates to user modification and/or updating of the settings and/or options of the logical container 34 that was previously associated with the specific user (i.e., owner). Device 12 may be a container/vault device and/or server or cloud computing node of a third party entity that contains a logical container 34 having user-modifiable settings and/or profiles. For example, a user connects (Block S146) to the vault interface using an authentication type. The vault sends (Block S148) a two-factor authentication code to a user-specified device. The user enters (Block S150) a two-factor code, and the vault checks whether the code matches. If there is no match, then the vault instructs (Block S156) the user to re-try authentication. Upon a third failed attempt, the vault sends (Block S158) a message to the two-factor authentication device with instructions to delay login. If there is a match, then the vault allows (Block S152) the user to update options and/or settings. The vault optionally allows (Block S154) the user to verify identity, licenses and certifications via an authentication process (i.e., government e-verify, social security, health provider, employer, education certifications, diplomas and degrees, licenses, job history, financials, housing history, financial history, health information, etc.). This allows for secure verified processes using the vault (i.e., voting, applying for benefits, accessing secure info, applying for employment, applying for loans, verifying medical scripts, etc.). This also allows for verification of identity, licensure and certification when authorized by owner. This information is stored in a forensic ledger (i.e., blockchain) to provide verification and authentication. Information ledger includes hashed information identifying one or more sources that provided the verification of each piece of information (i.e., third party owner, certification supplier, etc.). This information provides the reliability of the authentication.

Figure 8:
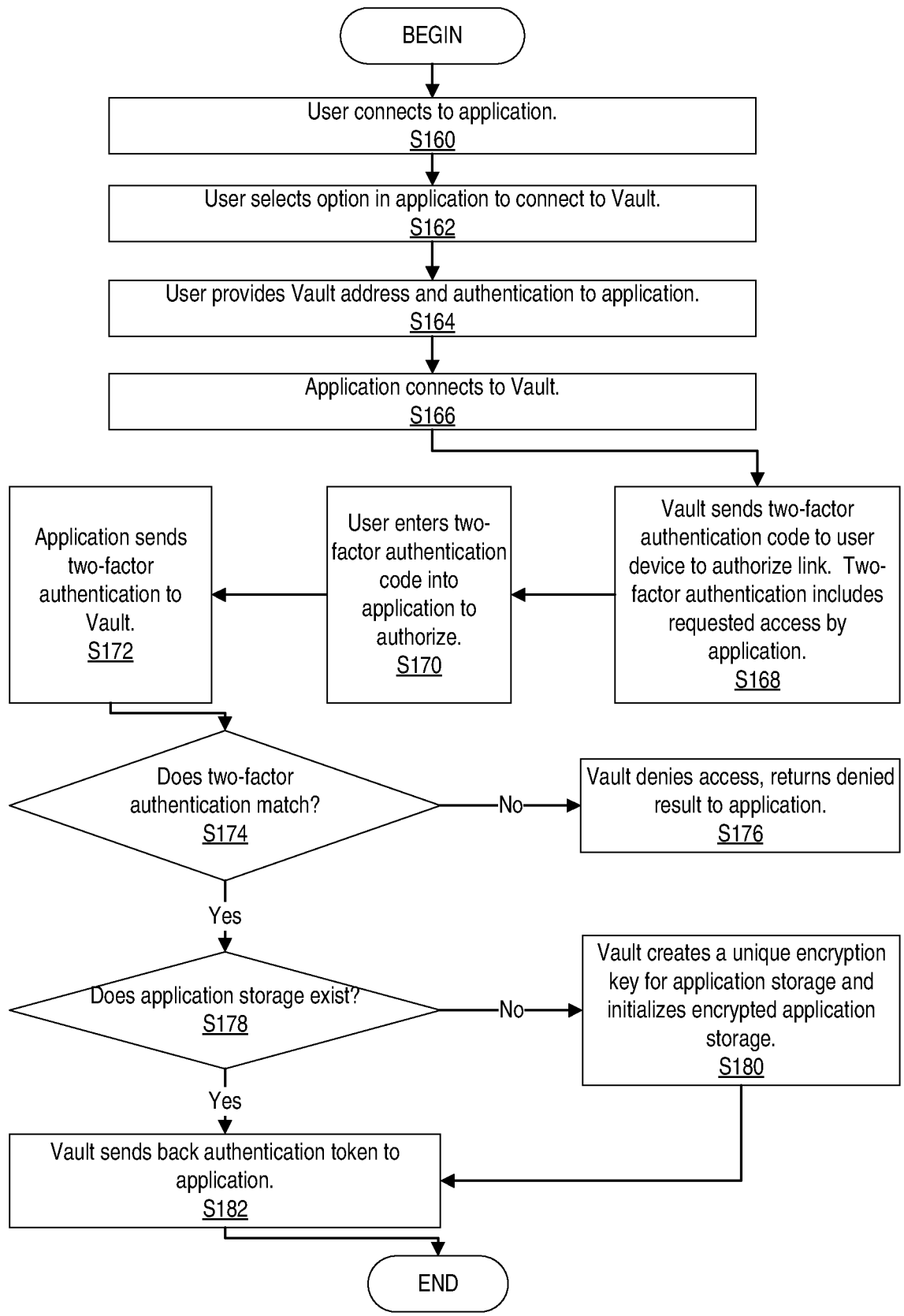
FIG. 8 is a flowchart of another example process according to the principles of the disclosure.

FIG. 8 is a flowchart of another example process according to the principles of the disclosure. In particular, FIG. 8 relates to linking application 16 to logical container 34 such as to authorize application 16 to access logical container, create a unique encryption key for a data portion 36 for the linked application 16 and initialize encryption application storage in data portion 36. Device 12 may be a container/vault device and/or server or cloud computing node of a third party entity that contains a logical container 34. For example, a user connects (Block S160) to an application 16. The user selects (Block S162) an option in the application 16 to connect to the vault. The user provides (Block S164) the vault address and authentication information to the application. The application connects (Block S166) to the vault. The vault sends (Block S168) a two-factor authentication code to a user device to authorize the link, where the two-factor authentication includes the requested access by application. The user enters (Block S170) a two-factor authentication code into the application. The application sends (Block S172) the two-factor authentication code to the vault. The vault checks (Block S174) whether the two-factor authentication matches. If there is no match, then the vault denies access and returns (Block S176) the "denied" result to the application. If there is a match, then the vault checks (Block S178) whether application storage exists. If not, then the vault creates (Block S180) a unique encryption key for application storage and initializes encrypted application storage. Then, the vault sends back (Block S182) an authentication token to the application.

Figure 9:
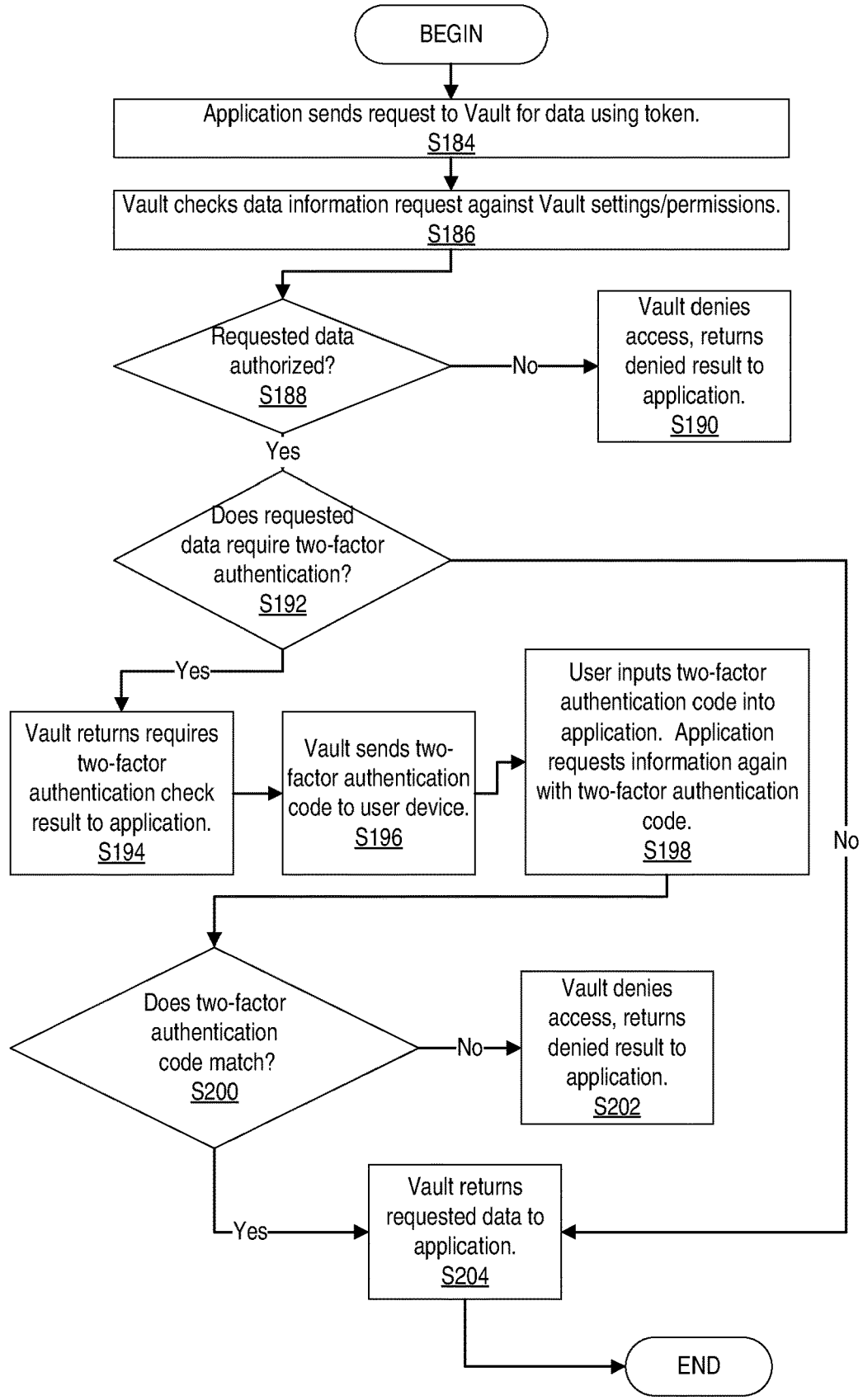
FIG. 9 is a flowchart of another example process according to the principles of the disclosure.

FIG. 9 is a flowchart of another example process according to the principles of the disclosure. In FIG. 9, application 16, that may have been previously linked to logical container 34 as described in FIG. 8, requests information from logical container 34, i.e., request data from one or more data portions 36. Device 12 may be a container/vault device and/or server or cloud computing node of a third party entity that contains a logical container 34. The logical container 34 may execute one or more code portions 38 to handle the request where logical container 34 may perform various actions to deny or fulfill the request (i.e., perform at least one operation). In one or more embodiments, all communication to and from logical container 34 is either through SSL and internal VPN if VPN is activated, or through a session unique key used to encrypt the data in transport. In one or more embodiments, all interactions are logged by the logical container 34 including IP address in the access transaction log in user storage.

For example, in some embodiments, the application 16 sends (Block S184) a data information request to the vault using a token. The vault checks (Block S186) the data information request against vault settings and/or permissions. The vault checks (Block S188) whether the requested data is authorized. If not, then the vault denies (Block S190) access and returns a "denied" result to the application 16. If it is authorized, then the vault checks (Block S192) whether the requested data information requires two-factor authentication. If not, then the vault returns (Block S204) the requested data to the application 16. If it does require two-factor authentication, then the vault proceeds with the two-factor authentication procedure. The vault returns (Block S194) a "requires two-factor authentication check" result to the application 16. The vault sends (Block S196) a two-factor authentication code to a user device. The user inputs a two-factor authentication code into the application 16. The application 16 then requests (Block S198) the data information again with the two-factor authentication code. The vault checks (Block S200) whether the two-factor authentication code matches. If not, then the vault denies (Block S202) access and returns a "denied" result to the application. If it does match, then the vault returns (Block S204) the requested data to the application 16.

Figure 10:
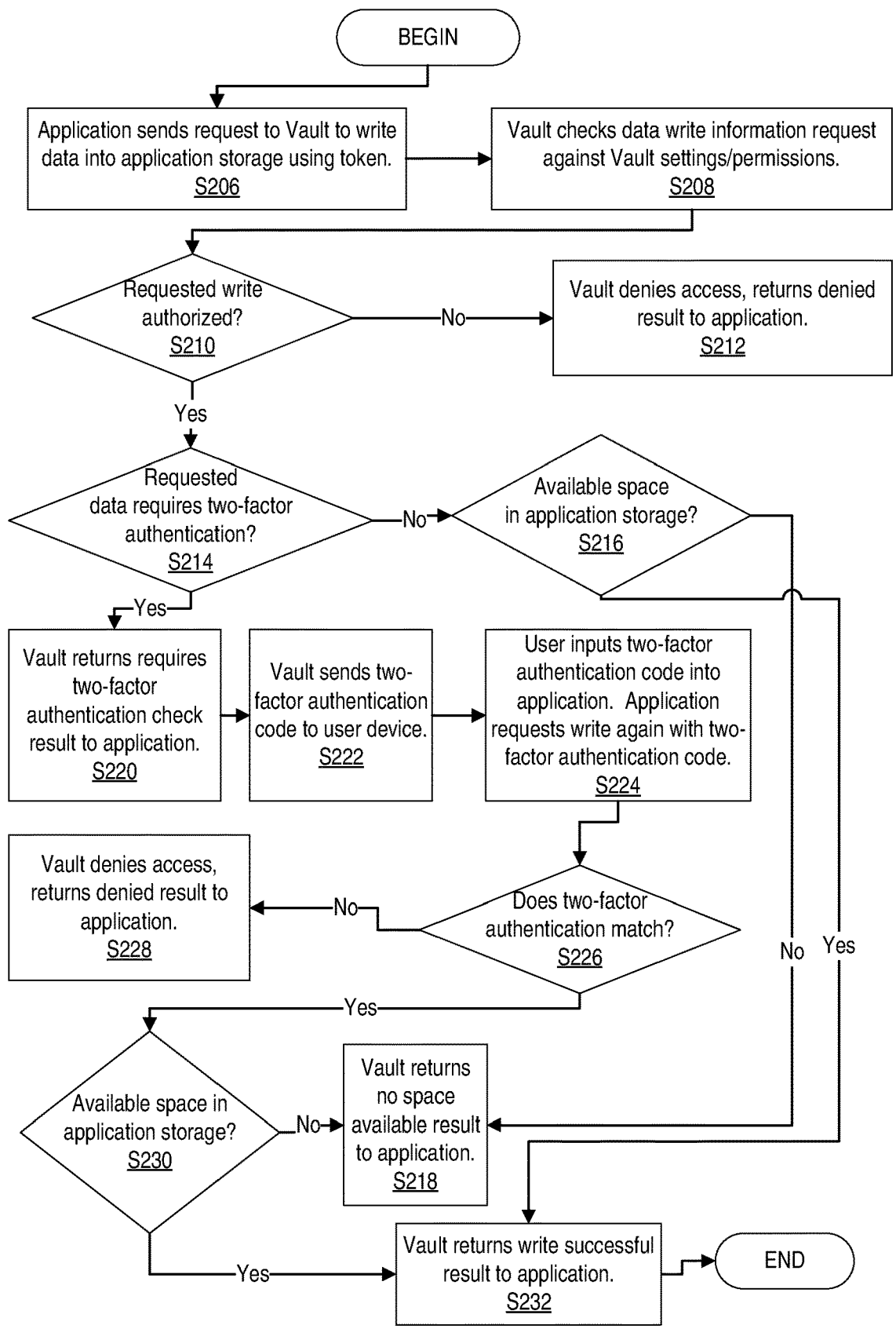
FIG. 10 is a flowchart of another example process according to the principles of the disclosure.

FIG. 10 is a flowchart of another example process according to the principles of the disclosure. In particular, application 16 that was previously linked to logical container 34 sends a request to logical container 34 to perform a data write, i.e., to perform an operation. Device 12 may be a container/vault device and/or server or cloud computing node of a third party entity that contains a logical container 34. The logical container 34 may execute one or more code portions 38 to handle the request where logical container 34 may perform various actions to deny or fulfill the request (i.e., perform at least one operation).

For example, the application 16 sends (Block S206) a request to the vault to write data into application storage using a token. The vault checks (Block S208) the data write information request against vault settings and/or permissions. The vault checks (Block S210) whether the requested write is authorized. If not, then the vault denies (Block S212) access and returns a "denied" result to the application 16. If it is authorized, then the vault checks (Block S214) whether the requested data write requires a two-factor authentication. If not, then the vault checks (Block S216) whether there is available space in application storage. If there is available space, then the vault returns (Block S232) a "write successful" result to the application 16. If there is no available space, then the vault returns (Block S218) a "no space available" result to the application 16. If the requested data write requires two-factor authentication, then the vault returns (Block S220) a "requires two-factor authentication check" result to the application 16. The vault sends (Block S222) a two-factor authentication code to the user device. The user inputs (Block S224) the two-factor authentication code into the application 16. The application 16 sends (Block S224) the write request to the vault again with the two-factor authentication code. The vault checks (Block S226) whether the two-factor authentication code matches. If not, then the vault denies (Block S228) access and returns a "denied" result to the application 16. If it does match, then the vault checks (Block S23) if there is available space in application storage. If not, then the vault returns (Block S218) a "no space available" result to the application 16. If there is available space, then the vault returns (Block S232) a "write successful" result to the application 16.

Figure 11:
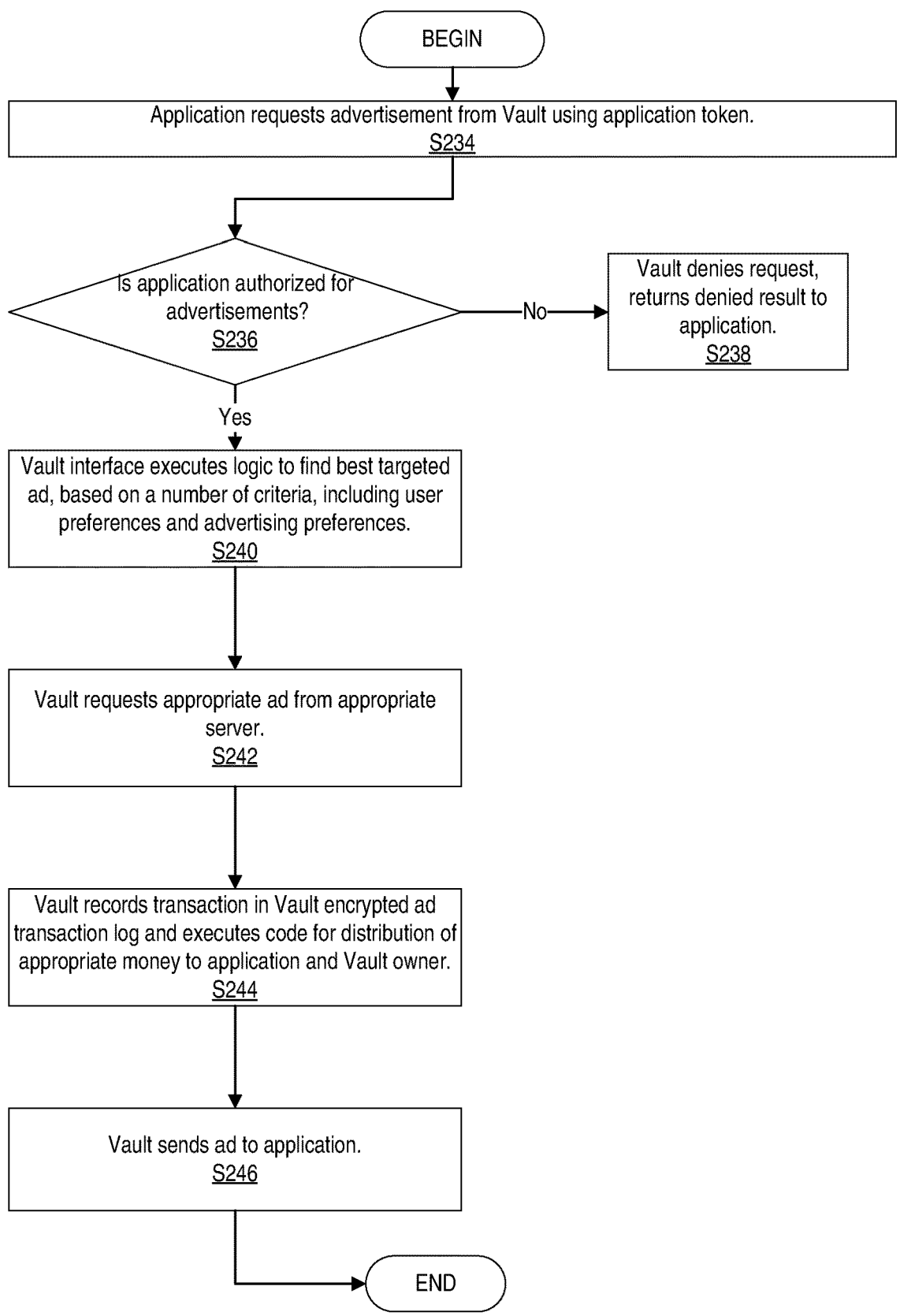
FIG. 11 is a flowchart of another example process according to the principles of the disclosure.

FIG. 11 is a flowchart of another example process according to the principles of the disclosure. In FIG. 11, application 16, which was previously linked, requests an advertisement from logical container 34. It is contemplated that device 12 may be a container/vault device and/or server or cloud computing node of a third party entity that contains a logical container 34. Since logical container 34 includes one or more data portions 36 with user specific data such as personal data, logical container 34 is in the best position to request the targeted advertisement for the user based on the one or more data portions 36, as allowed by the user's preferences and advertisement preferences. The logical container 34 may execute one or more code portions 38 (e.g., vault interface code portion) to handle the request where logical container 34 may perform various actions to deny or fulfill the request (i.e., perform at least one operation). For example, an application 16 requests (Block S234) an advertisement from the vault using an application token. The vault checks (Block S236) if the application 16 is authorized for advertisements. If not, then the vault denies the request and returns (Block S238) a "denied" result to the application. If it is authorized, then the vault interface executes (Block S240) logic to find the best targeted advertisement based on a number of criteria, including user preferences and advertising preferences. The vault requests (Block S242) an appropriate advertisement from the appropriate server. The vault records the transaction in the vault encrypted advertisement transaction log and executes (Block S244) code for distribution of appropriate money to application 16 and vault owner. The vault sends (Block S246) the advertisement to the application 16.

Figure 12:
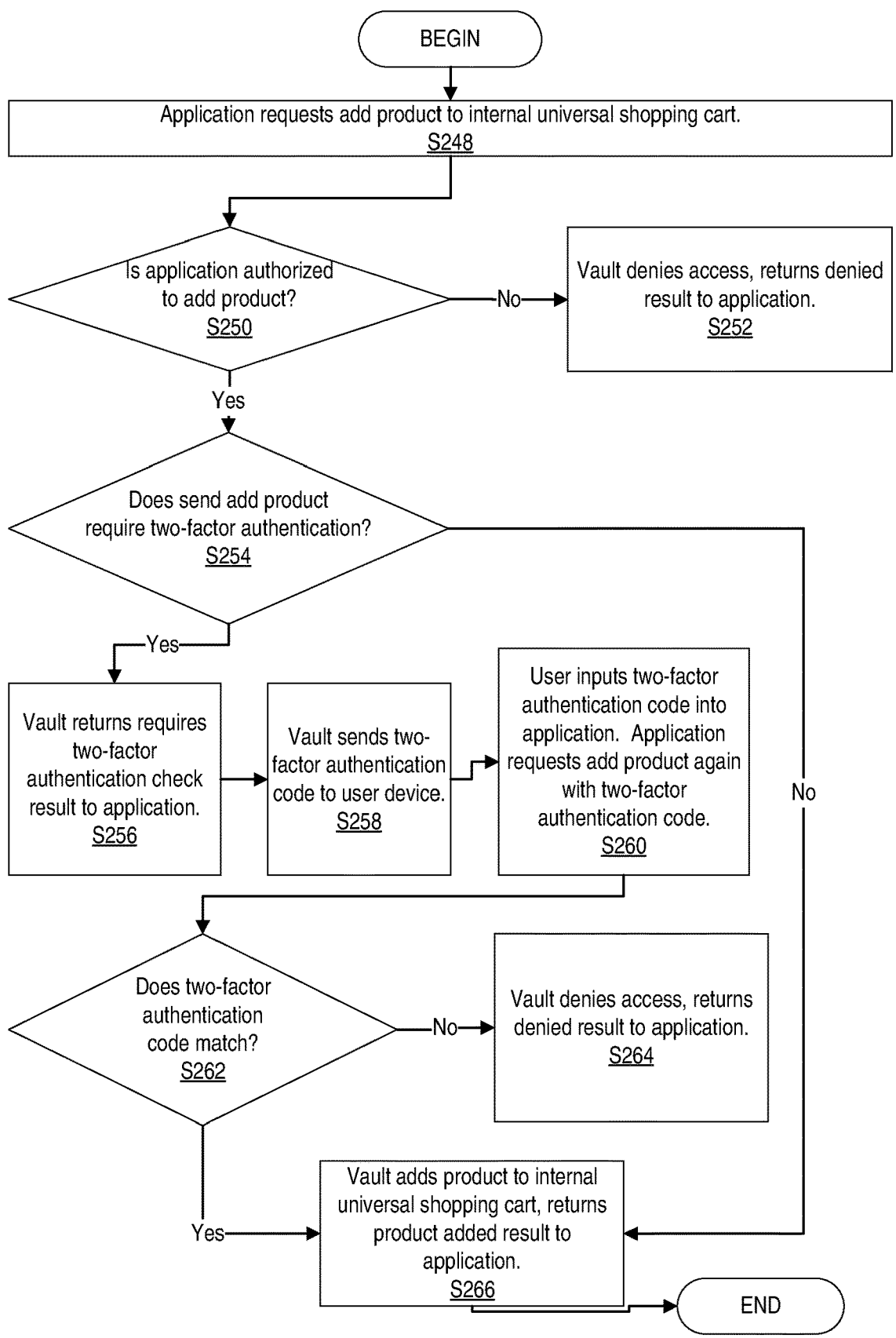
FIG. 12 is a flowchart of another example process according to the principles of the disclosure.

FIG. 12 is a flowchart of another example process according to the principles of the disclosure. In particular, application 16 requests to add a product to an internal universal shopping cart stored by logical container 34 such as in a data portion 36. Device 12 may be a container/vault device and/or server or cloud computing node of a third party entity that contains a logical container 34. The logical container 34 may execute one or more code portions 38 to handle the request where logical container 34 may perform various actions to deny or fulfill the request (i.e., perform at least one operation). Further, in one or more embodiments, the internal universal shopping cart stored in data portion 36 may be shared by logical container 34 by executing one or more code portions 38.

For example, an application 16 requests (Block S248) to add a product to an internal universal shopping cart. The vault checks (Block S250) whether the application 16 is authorized to add the product. If not, then the vault denies (Block S252) access and returns a "denied" result to the application 16. If it is authorized, then the vault checks (Block S254) whether the add product request requires two-factor authentication. If not, then the vault adds the product to the internal universal shopping cart and returns (Block S266) the "product added" result to the application 16. If it does require two-factor authentication, then the vault returns (Block S256) a "requires two-factor authentication check" result to the application 16. The vault sends (Block S258) a two-factor authentication code to a user device. The user inputs the two-factor authentication code into the application 16, and the application 16 requests (Block S260) to add the product again with the two-factor authentication code. The vault checks (Block S262) whether the two-factor authentication code matches. If not, then the vault denies access and returns (Block S264) a "denied" result to the application 16. If it does match, then the vault adds the product to the internal universal shopping cart and returns (Block S266) a "product added" result to the application 16.

Figure 13:
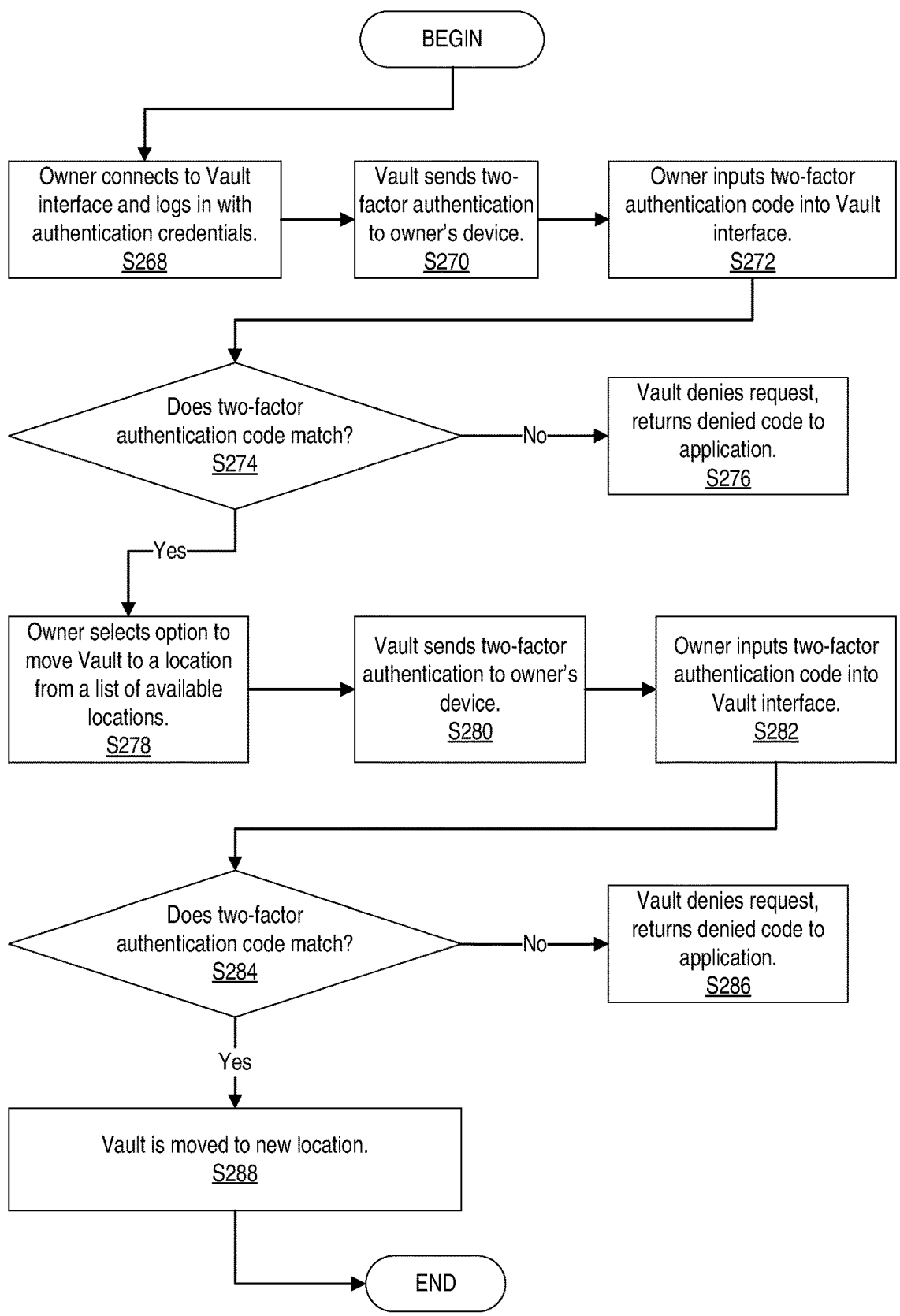
FIG. 13 is a flowchart of another example process according to the principles of the disclosure.

FIG. 13 is a flowchart of another example process according to the principles of the disclosure. The ability to move or transfer logical container 34 with code portions 38 and data portions 36 to another device or entity upon user request advantageously allows the user to total control over logical container 34. Device 12 may be a container/vault device and/or server or cloud computing node of a third party entity that contains a logical container 34. For example, the user may request for logical container 34 to move transferred to a USB drive, which allows the user control as to when the data portions 36 are electronically available. In particular, the user/owner may connect to the logical container 34 interface such as via primary device 18 in order to select a new location to move the logical container 34. The logical container 34 may execute one or more code portions 38 to handle the request where logical container 34 may perform various actions to deny or fulfill the request (i.e., perform at least one operation).

For example, an owner connects to the vault interface and logs in (Block S268) with authentication credentials, as described here. The vault sends (Block S270) a two-factor authentication to the owner's device. The owner inputs (Block S272) the two-factor authentication code into the vault interface. The vault checks (Block S274) whether the two-factor authentication code matches. If not, then the vault denies the request and returns (Block S276) a "denied" result to the application 16. If it does match, then the owner selects (Block S278) an option to move the vault to a location from a list of available locations. The vault sends (Block S280) another two-factor authentication code to the owner's device. The owner inputs (Block S282) the two-factor authentication code into the vault interface. The vault checks (Block S284) whether the two-factor authentication code matches. If not, then the vault denies (Block S286) the request and returns a "denied" code to the application 16. If it does match, then the vault is moved (Block S288) to a new location.

Further, in one or more embodiments, logical container 34 may include code portion 38 for performing validation of one or more data portions 36. For example, logical container 34 may execute a validation code portion 38 where logical container 34 requests for some or all of data portion 36 (e.g., including a loan application, social security number, voter information, housing history, employment history, education history, diplomas, certifications, government licensing, government clearance, trade certifications, military service history, prescriptions, etc.) to be verified. Validation code portion 38 may be configured to determine the appropriate server or third party server (e.g., government server) with which to request validation, and to transmit the request with some or all of the data portion 36 to be validated. Logical container 34 may receive a digital certification or digital data indicating that some or all of the data portion 36 was validated where the certification may be stored with the validated data portion 36 or in a separate data portion 36. The specific signaling and flowchart for this validation embodiment may be following one or more of the figures described and/or provided with the disclosure where the specific request and entity 14 may be modified as described above. In one or more embodiments, the validated data may be requested by application 16 where the logical container 34 may provide a single-use hyperlink to the requirement entity/application 16 where the requesting entity/application 16 would access the link and could be authorized in real-time by the user/owner of the logical container 34 via a notification confirmation. The access of the validated data would be logged in the logical container 34.

Some Examples

In one example, a search engine application may use the logical container described herein to store user profile and search history while continuing to protect user privacy. The search engine, using the logical container, is also able to provide targeted advertising and generate revenue to the user while continuing to protect user privacy and helping prevent misuse of the user data.

In another example, social media companies using the logical container will be able to store user profiles, messages and other application specific information in application protected sections in the logical container. The social media companies using the logical container will be able to generate revenue from targeted advertisement while providing user privacy and helping prevent misuse of user data.

In another example, technology companies that provide various services such as e-mail, search engine, cloud computing, etc., are able to use the logical container described herein to store user profiles, email and other application specific information in application protected section in the locker. These companies are able to generate revenue from targeted advertising while protecting user privacy by use of the logical container. Further, the logical container reduces the risk of misuse of data.

In another example, geolocation service user profiles, geolocation and other application specific information is stored in the application protected section (i.e., code portion) of the logical container such that there is reduced risk of having user location data compromised. The geolocation service is also able to generate revenue from targeted advertising while providing user privacy and reducing the risk of the misuse of user data.

In another example, a cellphone or mobile device application using the logical container is able to store all user contacts, text messages, calendar and other phone specific information in application protected sections (i.e., code portion) of the logical container. If a user switches mobile phone service providers, user is able to download all information onto a new phone using the logical container.

Example A1. An apparatus (e.g., device/server 12) including processing circuitry 26 comprising a processor 28 and memory 30, the memory 30 configured to store a logical container 34 including a plurality of data portions 36 and a plurality of executable code portions 38, each of the plurality of data portions 36 and the plurality of executable code portions 38 being separately encrypted with a different encryption key and being associated with a user, the processing circuitry configured to: receive, from a software application (e.g., application 16) operating in another device, a request associated with at least one of the plurality of data portions 36 and the plurality of executable code portions 38 of the logical container 34, the request including an encryption token associated with the software application 16; in response to the request, trigger a verification code portion of the plurality of executable code portions 38 to determine whether the request is authorized; and perform at least one operation to fulfill the request in response to determining the request is authorized.

Example A2. The apparatus of Example A1, wherein the verification code portion is configured to cause the processing circuitry 26 to: compare the request with a permission data portion of the plurality of data portions 36 that is defined by the user; determine whether the request meets at least one criterion in the permission data portion; perform user based authentication to determine whether to authorize the software application 16.

Example A3. The network node of Embodiment A1, wherein the processing circuitry 26 is further configured to: receive, from the software application 16, a request to link the software application to the logical container; determine whether to authorize the linking based at least in part on user verification; in response to determining the linking is authorized, assigning and transmitting a unique encryption key to the software application; and create a storage space in memory 30 that is specific to the software application 16, the storage space being encrypted with the assigned unique encryption key.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A device including processing circuitry, the processing circuitry comprising:
    a processor;
    a memory in communication with the processor, the memory being configured to store a logical container, the logical container including a plurality of encrypted data portions and a plurality of executable code portions, each of the plurality of encrypted data portions and the plurality of executable code portions being separately encrypted with a different encryption key and being associated with a user; and
    the processing circuitry configured to:
        receive, from a software application operating in another device, a first request associated with at least one of the plurality of encrypted data portions and with at least one of the plurality of executable code portions of the logical container, the first request including an encryption token associated with the software application;
        in response to the first request, trigger a verification code portion of the plurality of executable code portions to determine whether the first request is authorized; and
        perform at least one operation to fulfill the first request in response to determining the request is authorized.

2. The device of claim 1, wherein the at least one operation includes running a first executable code portion of the plurality of executable code portions, the first executable code portion including code for accessing a first encrypted data portion of the plurality of encrypted data portions.

3. The device of claim 1, wherein the processing circuitry is further configured to:
    receive, from the software application, a linking request to link the software application to the logical container;
    determine whether to authorize the linking based at least in part on a user verification;
    in response to determining the linking is authorized, assign and transmit a unique encryption key to the software application; and
    create a storage space in the memory that is specific to the software application, the storage space being encrypted with the assigned unique encryption key.

4. The device of claim 1, wherein the logical container is configured to be transferable to another device in response to a transfer request from the user, the transfer request triggering the execution of a second executable code portion of the plurality of executable code portions, the second executable code portion including at least one operation to determine whether the transfer request is authorized.

5. The device of claim 1, wherein the logical container is configured to request a targeted advertisement for the user based on at least one of the plurality of encrypted data portions.

6. The device of claim 5, wherein the plurality of encrypted data portions includes at least one of the user's advertising history and the user's purchase history.

7. The device of claim 1, wherein the plurality of executable code portions includes an advertising request application program interface, API, code portion.

8. The device of claim 1, wherein the device is a cloud computing node of a third party entity.

9. The device of claim 1, wherein the device is accessible by a primary device associated with the user to access the logical container using a two-factor authentication.

10. The device of claim 1, wherein the verification code portion is configured to cause the processing circuitry to:
compare the first request with a permission data portion of the plurality of encrypted data portions that is defined by the user;
determine whether the first request meets at least one criterion in the permission data portion; and
perform a user-based authentication to determine whether to authorize the software application.

11. A method implemented by a device for securing a user's data, the device including processing circuitry, the processing circuitry including a processor and a memory, the memory being configured to store a logical container, the logical container including a plurality of encrypted data portions and a plurality of executable code portions, each of the plurality of encrypted data portions and the plurality of executable code portions being separately encrypted with a different encryption key and being associated with a user, the method comprising:
receiving, from a software application operating in another device, a first request associated with at least one of the plurality of encrypted data portions and with at least one of the plurality of executable code portions of the logical container, the first request including an encryption token associated with the software application;
in response to the first request, triggering a verification code portion of the plurality of executable code portions to determine whether the first request is authorized; and
performing at least one operation to fulfill the first request in response to determining the request is authorized.

12. The method of claim 11, further comprising running a first executable code portion of the plurality of executable code portions, the first executable code portion including code for accessing a first encrypted data portion of the plurality of encrypted data portions.

13. The method of claim 11, further comprising:
receiving, from the software application, a linking request to link the software application to the logical container;
determining whether to authorize the linking based at least in part on a user verification;
in response to determining the linking is authorized, assigning and transmitting a unique encryption key to the software application; and
creating a storage space in the memory that is specific to the software application, the storage space being encrypted with the assigned unique encryption key.

14. The method of claim 11, further comprising transferring the logical container to another device in response to a transfer request from the user, the transfer request triggering the execution of a second executable code portion of the plurality of executable code portions, the second executable code portion including at least one operation to determine whether the transfer request is authorized.

15. The method of claim 11, further comprising requesting a targeted advertisement for the user based on at least one of the plurality of encrypted data portions.

16. The method of claim 15, wherein the plurality of encrypted data portions includes at least one of the user's advertising history and the user's purchase history.

17. The method of claim 11, wherein the plurality of executable code portions includes an advertising request application program interface, API, code portion.

18. The method of claim 11, wherein the device is a cloud computing node of a third party entity.

19. The method of claim 11, further comprising:
comparing the first request with a permission data portion of the plurality of data portions that is defined by the user;
determining whether the first request meets at least one criterion in the permission data portion; and
performing a user-based authentication to determine whether to authorize the software application.

20. A cloud computing node, comprising:
processing circuitry including:
a processor;
a memory in communication with the processor, the memory being configured to store a logical container, the logical container including a plurality of encrypted data portions and a plurality of executable code portions, each of the plurality of encrypted data portions and the plurality of executable code portions being separately encrypted with a different encryption key and being associated with a user, the plurality of encrypted data portions including at least one of the user's advertising history and the user's purchase history, the plurality of executable code portions including an advertising request application program interface, API, code portion; and
the processing circuitry being configured to:
receive, from a software application operating in a device, a first request associated with at least one of the plurality of encrypted data portions and with at least one of the plurality of executable code portions of the logical container, the first request including an encryption token associated with the software application;
in response to the first request, trigger a verification code portion of the plurality of executable code portions to determine whether the first request is authorized;
perform at least one operation to fulfill the first request in response to determining the first request is authorized, the at least one operation including running a first executable code portion of the plurality of executable code portions, the first executable code portion including code for accessing a first encrypted data portion of the plurality of encrypted data portions;
receive, from the software application, a linking request to link the software application to the logical container;
determine whether to authorize the linking based at least in part on a user verification;
in response to determining the linking is authorized, assign and transmit a unique encryption key to the software application, and create a storage space in the memory that is specific to the software application, the storage space being encrypted with the assigned unique encryption key;
the logical container being configured to:
transfer to another device in response to a transfer request from the user, the transfer request triggering the execution of a second executable code portion of the plurality of executable code portions, the second executable code portion including at least one operation to determine whether the transfer request is authorized; and the verification code portion being configured to:
compare the first request with a permission data portion of the plurality of data portions that is defined by the user;
determine whether the first request meets at least one criterion in the permission data portion; and
perform a user-based authentication to determine whether to authorize the software application.

* * * * *